United States Patent [19]

Hanson et al.

[11] Patent Number: 4,791,438

[45] Date of Patent: Dec. 13, 1988

[54] BALANCED CAPILLARY INK JET PEN FOR INK JET PRINTING SYSTEMS

[75] Inventors: Gary E. Hanson; Gar P. Kelly; C. S. Chan, all of Boise, Id.; Bruce Cowger, Corvallis, Oreg.; James G. Bearss, Boise, Id.

[73] Assignee: Hewlett-Packard Company, Palo Alto, Calif.

[21] Appl. No.: 115,013

[22] Filed: Oct. 28, 1987

[51] Int. Cl.[4] ........................ G01D 15/16; G01D 9/00

[52] U.S. Cl. .................................. 346/140 R; 346/1.1

[58] Field of Search .............. 346/140 PD, 140 R, 1.1

[56] References Cited

U.S. PATENT DOCUMENTS

| | | | |
|---|---|---|---|
| 4,419,678 | 12/1983 | Kasugayama | 346/140 PD |
| 4,436,439 | 3/1984 | Koto | 346/140 PD |
| 4,539,568 | 9/1985 | Lewis | 346/140 PD |

*Primary Examiner*—E. A. Goldberg

*Assistant Examiner*—Mark Reinhart

*Attorney, Agent, or Firm*—William J. Bethurum

[57] ABSTRACT

This application is directed to an ink jet pen having an ink supply housing which includes a primary ink reservoir (30) and a secondary ink reservoir (26). A balancing capillary member is positioned within the ink supply housing and includes ink flow path (20, 24) which extends between the primary ink reservoir (30) and the secondary ink reservoir (26). This capillary member is operative to draw ink from the primary ink reservoir (30) and into or toward the secondary ink reservoir (26) by capillary action as temperature and pressure within the primary ink reservoir increases. Conversely, when temperature and pressure in the housing decreases, ink will be drawn back into or toward the primary ink reservoir (30). In addition, the primary ink reservoir (30) is connected by way of a suitable ink feed path to an ink jet printhead (32) for supplying ink to the printhead during an ink jet printing operation.

16 Claims, 9 Drawing Sheets

VERTICAL CAPILLARY SYSTEM

DUAL RESERVOIR CAPILLARY SYSTEM NO.1

DUAL RESERVOIR CAPILLARY SYSTEM NO. 2

BALANCED CAPILLARY INK JET PEN FOR INK JET PRINTING SYSTEMS

TECHNICAL FIELD

This invention relates generally to ink jet pens for ink jet printing systems and more particularly to such pens having an increased ink reservoir capability and improved ink distribution characteristics.

BACKGROUND ART AND RELATED APPLICATION

In the manufacture of disposable pens for various types of ink jet printers, various approaches have been taken to insure that a substantially constant backpressure is provided in the ink reservoir of the pen as the ink is depleted from full to empty during a printing operation. In this manner, the size of the ink drops ejected from an orifice plate of the pen will remain constant during ink depletion, and additionally this constant backpressure will prevent leakage of ink from the orifice plate when the pen is inactive. One such approach to providing a substantially constant backpressure in the ink reservoir of a thermal ink jet pen is disclosed and claimed in the U.S. Pat. No. 4,509,062 issued to Robert Low et al and entitled "Ink Reservoir With Essentially Constant Negative Backpressure".

Whereas the approach described in the above Low et al patent has proven highly satisfactory and unique in many respects, this approach nevertheless requires a collapsible bladder in order to maintain a substantially constant backpressure in the ink reservoir over a certain range of ink depletion therein. This requirement for a collapsible bladder has certain attendant disadvantages which are overcome by the present invention and will be appreciated and better understood from the description to follow.

Another prior approach to providing a controlled backpressure in the ink reservoir of a different, stencil type of pen utilizes a so called capillary compensating technique wherein the main ink reservoir of the pen is connected to a capillary ink flow path or groove. This path or groove is operative to receive a varying quantity of ink during ink reservoir depletion to thereby maintain a substantially constant back pressure in the main ink reservoir. One such capillary compensating technique used in a stencil pen is disclosed in German Patent No. 2,844,886 issued to Witz et al.

Whereas the above technique in the German Patent No. 2,844,886 may be suitable over a limited ink reservoir volume and a limited range of operating temperatures, the stencil pen of the above German Patent is not capable of handling relatively large ink reservoir volumes operating over relatively large changes in ink operating temperature. Furthermore, the capillary groove capacity of the pen disclosed in the above German Patent No. 2,844,886 will typically be on the order of eight to ten percent of the ink reservoir capacity, and this ratio in turn means a relatively large increase in capillary groove capacity for desired corresponding increases in ink reservoir capacity. Thus, this eight to ten percent volume of capillary groove requirement in the Witz et al German patent imposes a rather substantial limitation on pen construction where a significant increase in size of the ink reservoir of the pen is required.

Another recent approach to providing a controlled backpressure in an ink reservoir of a disposable ink jet pen is disclosed and claimed in copending application Ser. No. 880,774 of Jeffrey Baker et al, filed July 1, 1986, assigned to the present assignee and incorporated herein by reference. In this latter approach, a reticulated polyurethane foam is used as an ink storage medium for both black and color ink jet pens. This more recent technique of storing ink in a porous medium such as polyurethane foam provides several new and useful improvements and distinct advantages with respect to the earlier bladder storage techniques. However, the requirement for a porous foam storage medium in the ink storage compartment of the pen limits the volumeric ink storage efficiency thereof.

DISCLOSURE OF INVENTION

It is a general object of the present invention to provide still further new and useful improvements in ink jet pens including the capability of ink storage without using a porous material or other ink storage media and their associated space requirements within the main reservoir of the pen body housing.

Another object is to provide a new and improved ink jet pen of the type described in which the volume of ink storage has been substantially increased relative to foam storage and other similar types of storage media of ink jet pens.

Another object is to provide an ink jet pen of the type described which operates with a substantially constant operating backpressure over a predetermined wide range of temperatures and during the operation of the pen as it is depleted from full to empty. The term "backpressure" as used herein means a pressure which is lower than the ambient pressure.

Another object is to provide a new and improved ink jet pen of the type described which may require a compensating capillary tube volume of as little as about one percent of the main ink reservoir capacity for proper backpressure operation.

A further object of this invention is to provide a new and improved ink jet pen of the type described which lends itself to improved and straightforward manufacturability at high production yields.

The above objects and other advantages and novel features of this invention have been accomplished by the provision of an ink jet pen having an ink supply housing which includes a primary ink reservoir and a secondary ink reservoir. A balancing capillary member is positioned within the ink supply housing and includes ink flow path which extends between the primary ink reservoir and the secondary ink reservoir. This capillary member is operative to draw ink from the primary ink reservoir and into or toward the secondary ink reservoir by capillary action as temperature and pressure within the primary ink reservoir increases. Conversely, when temperature and pressure in the housing decreases, ink will be drawn back into or toward the primary ink reservoir. In addition, the primary ink reservoir is connected by way of a suitable ink feed path to an ink jet printhead for supplying ink to the printhead during an ink jet printing operation.

The above summary, objects, novel features and attendant advantages of this invention will become better understood from the following description of the accompanying drawings:

DETAILED DESCRIPTION OF THE DRAWINGS

Figure 1A:
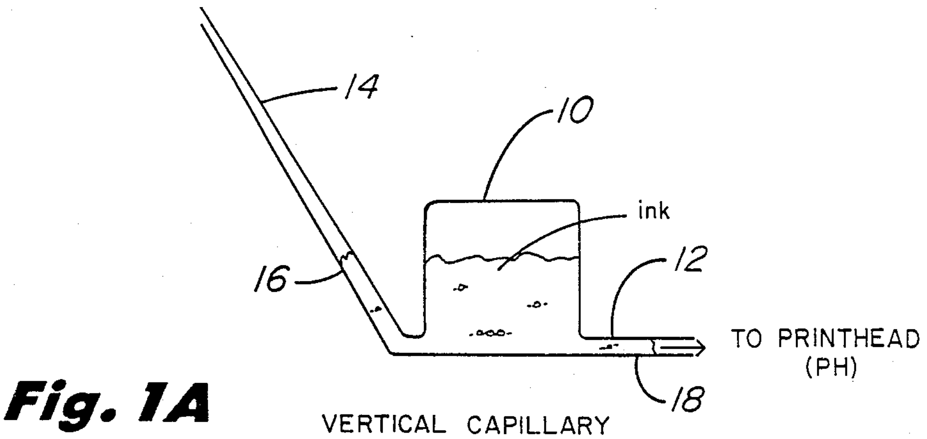
FIG. 1A is a schematic fluid flow diagram to illustrate the vertical capillary embodiment of the invention shown in FIG. 2.

Referring now to FIG. 1A, the fluid flow schematic shown therein includes an ink reservoir tank 10 from which an ink feed tube 12 extends to a printhead of an inkjet pen. A vertical capillary tube 14 extends upwardly at the angle shown and is tapered to increasingly smaller cross sections as the vertical height of the capillary tube 14 increases. When the pressure inside the ink reservoir 10 increases with corresponding increases in temperature therein, the ink 16 will be drawn upwardly in the capillary tube 14 to thereby maintain a substantially constant backpressure which is generated at the ink meniscus 18 and is the pressure at the location where the pen body housing joins the printhead, both of which are described in more detail below. Conversely, when the pressure inside the ink reservoir 10 decreases, the ink 16 in the capillary tube 14 will again move downward and tend to maintain the meniscus 18 at a substantially constant backpressure. As will be shown in more detail in FIG. 2 below, the shape of the capillary feed tube 14 may be configured in a serpentine type of geometry which extends vertically upward in a back and forth pattern for each of a plurality of ink compartments of the ink jet pen. In this manner, capillary tube capacity in a given volume can be greatly increased.

Figure 1B:
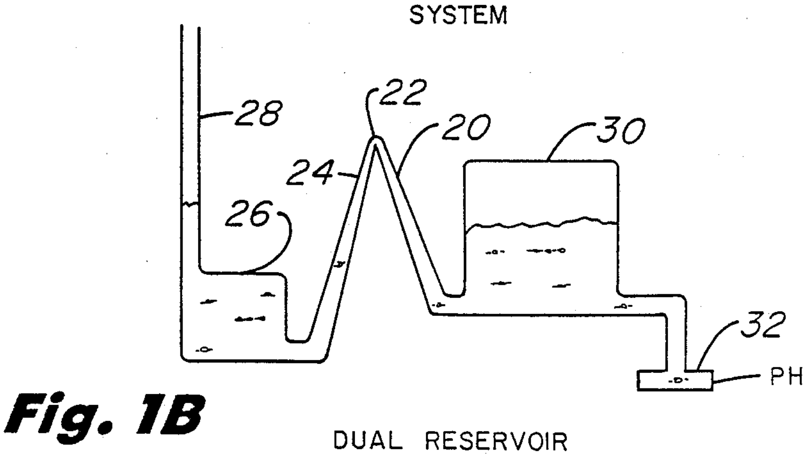
FIG. 1B is a schematic fluid flow diagram to illustrate the dual reservoir capillary system no. 1 shown in FIG. 3.

Referring now to FIG. 1B, in this embodiment of the invention the right hand vertical capillary tube portion 20 is also tapered with a decreasing cross section towards its apex 22 and is integrally joined with a left hand capillary tube portion 24, also tapered, which feeds into a secondary reservoir 26 having its own vertical vent/capillary tube 28. Thus, in the embodiment of FIG. 1B, the capillary ink storage capacity has been substantially increased relative to FIG. 1A and now includes both a secondary reservoir 26 and a primary reservoir 30 as well as a capillary path of substantial length between the reservoirs 26 and 30. As the ink moves upwardly in the right hand capillary tube 20, there is maintained a slightly negative head at the printhead member 32. This condition is maintained even after the ink passes through the apex 22 and begins its downward movement in the capillary tube portion 24 and toward the secondary ink reservoir 26.

When the secondary reservoir 26 begins to take in ink from the capillary tube 24, the pressure at the printhead 32 becomes slightly positive by the vertical distance between the printhead 32 and the free ink surface within the secondary reservoir 26. This is also true for the schematic diagram of FIG. 1C to be described. In both of these two embodiments, the secondary reservoir should be located vertically as close to the printhead as is physically possible in order to minimize the slight, but tolerable, positive head at the printhead which occurs with the filling of the secondary reservoir. When the pressure in the primary reservoir 30 begins to decrease, then the ink will be drawn from the secondary reservoir 26 and back through the capillary tube portions 24 and 20, respectively, and into the main ink reservoir 30.

If possible from a design standpoint, it is preferable to locate the secondary reservoir below the ink jet printhead and this design would always insure that the pen operates with a constant backpressure. Unfortunately this latter design is not always available as a result of other design constraints placed upon pen construction.

Figure 1C:
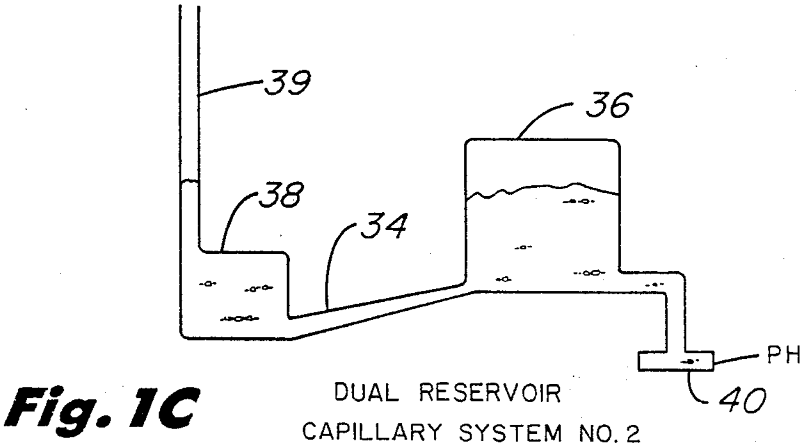
FIG. 1C is a schematic fluid flow diagram to illustrate the dual reservoir capillary system no. 2 shown in FIG. 4.

Referring now to FIG. 1C, which is a schematic diagram for the third embodiment of the invention illustrated in FIG. 4, this embodiment is referred to herein as the dual reservoir capillary system embodiment number 2. This embodiment has also been alternatively referred to herein as the "sump pump" embodiment and includes a capillary tube 34 of tapered cross section which passes ink directly as shown between the main ink reservoir 36 and a secondary ink reservoir 38. As in FIG. 1B, the secondary ink reservoir 38 includes its own vertical capillary/vent tube 39 which provides additional ink overflow capacity in this embodiment of the invention. The ink position on the capillary section 34 tends to maintain a substantially constant backpressure at the printhead 40 in the manner previously described with changes in pressure and temperature in the main reservoir 36. As in embodiment 1, ink in the secondary reservoir produces slight but tolerable positive pressure and is positioned accordingly. The significance of this embodiment is that the capillary tube 34 has been significantly shortened relative to FIG. 1B, and this feature allows for more closely positioning the primary and secondary reservoirs adjacent one another within the pen body housing. The exact nature of the controlled capillary action for all of the schematic diagrams in FIGS. 1A, 1B and 1C will become better understood in the following description of the three preferred corresponding physical embodiments of the present invention.

In each of the three (3) embodiments described below, a substantially constant "negative head" or "backpressure" is maintained at the printhead within each structure described for both a normal temperature range printing operation (the "dynamic" operation) and the normal standby mode, or "static" case. For the over-temperature case and with the secondary reservoir taking in ink, the slight positive pressure at the printhead will be determined in large part by the geometry and location of the secondary reservoir. However, for all of the above conditions of pen operation, certain known operating parameters will enable one skilled in the art to size the dimensions and geometries of the reservoirs and capillary tubes in such a manner as to precisely control the pressures at the output printhead.

The surface tension, viscosity, and wetting angle of the ink can be known for its interaction with the material used in pen body housing construction. Then using the parameters of surface tension and ink-to-solid contact angle (angle of wettability), the proper size and geometries of the capillary tubes can be ascertained and used to control air bubble formation in to the main reservoir. And, it is this control of air bubble formation in the main reservoir and designed capillary draw in the tubing that in turn provides the control of pressures in the main ink reservoir and at the ink jet printhead for the above two (2) operating conditions for each of the three (3) embodiments. For example, the pressure regulation in the operational mode in each of the primary or main ink reservoirs of these three embodiments is achieved by the combination of air bubble formation in each reservoir. In the standby mode, pressure regulation is maintained by capillary draw in the connecting capillary tube. In the overflow mode (due to temperature or pressure changes) pressure is limited by geometric positioning of the secondary reservoir for the dual reservoir systems.

Figure 2A:
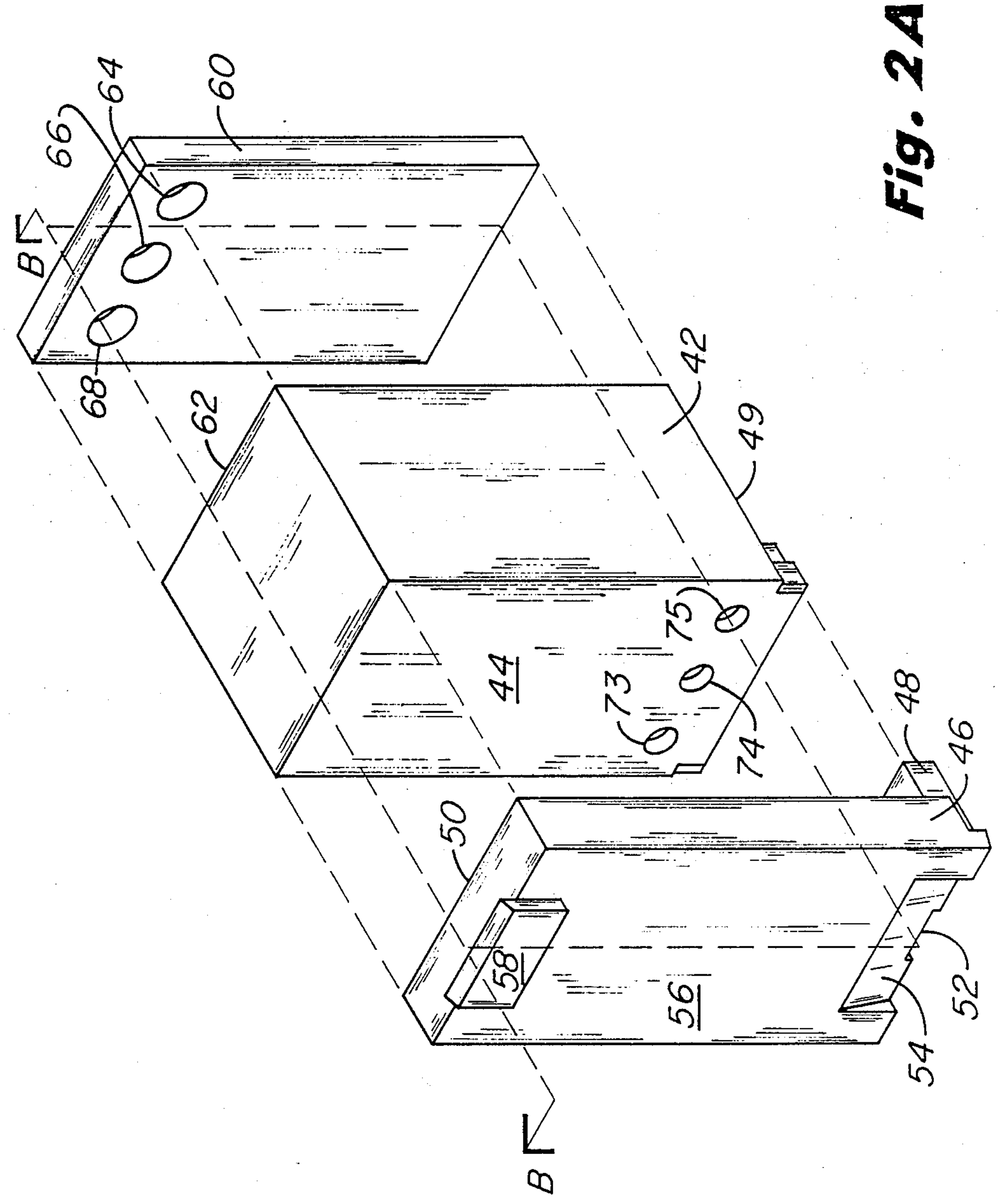
FIG. 2A is an exploded isometric view showing the vertical capillary pen structure in accordance with a first embodiment of the invention for a multicolor ink jet pen.
Figure 2B:
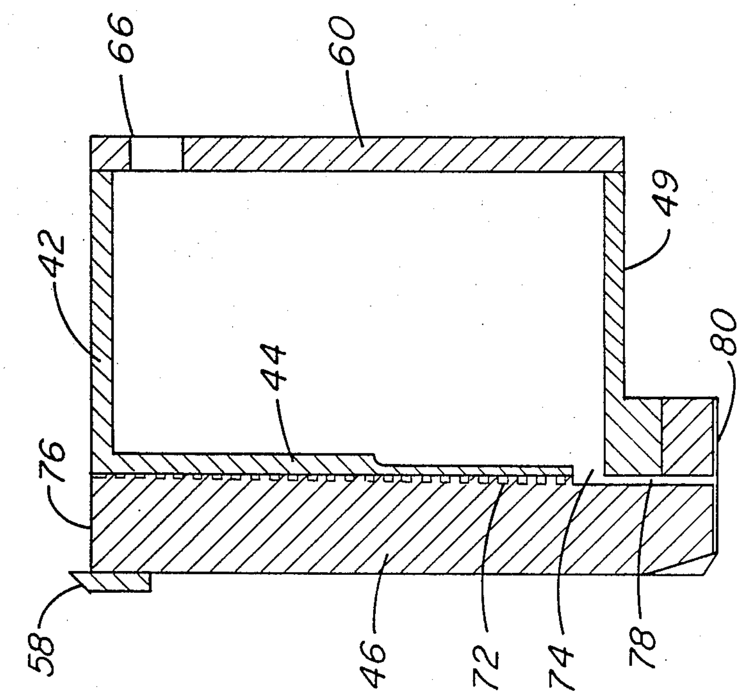
FIG. 2B is a cross section view taken along lines B—B of FIG. 2A.
Figure 2C:
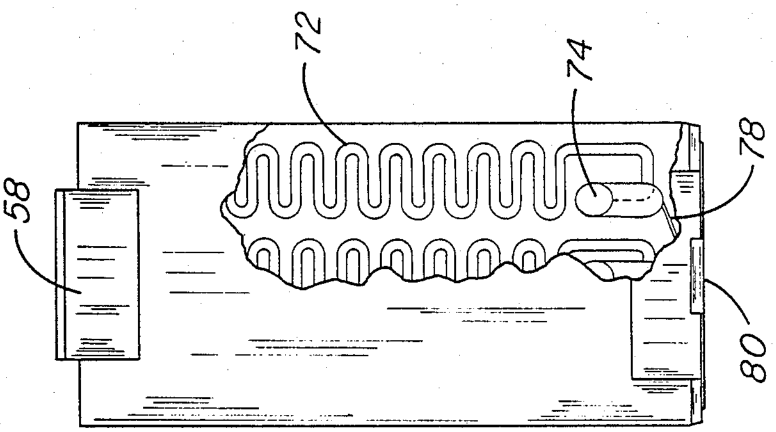
FIG. 2C is a partially cut-away elevation view showing the geometry of the balanced capillary tubes in the structures of FIGS. 2A and 2B above.

Referring now to FIGS. 2A, 2B and 2C, the exploded isometric view in FIG. 2A includes a main ink reservoir member 42 having one outer wall 44 for receiving the front or face plate 46 in the manner indicated. The face plate member 46 includes an integral shelf 48 which is received as shown beneath a bottom wall 49 of the main ink reservoir 42. The right hand or hidden wall 50 of the front plate 46 includes the serpentine capillary ink flow paths to be further described, and the front plate 46 further includes an offset lower downwardly facing section 52 for receiving the thin film resistor printhead or other equivalent type of ink jet printhead not shown in this figure. This printhead may advantageously be connected to and electrically driven by means of a flexible circuit element or the like (not shown) which is wrapped around the tapered wall 54 and then up along the front face 56 of the front plate 46. The upstanding member 58 is a latching device which facilitates locking the pen into a pen carriage or the like and is a mechanical detail which is not significant to the operation of the present invention.

A back plate 60 is adapted to provide a cover for a large opening in the back wall 62 of the main ink reservoir 42, and the back plate 60 includes a plurality of ink feed ports 64, 66 and 68 which may advantageously be used as ink supply paths for three different color ink compartments (not shown) which may be constructed within the interior of the main ink reservoir 42. These interior separate compartments are connected by way of the ink feed openings 73, 74 and 75 in the housing wall 44 to a corresponding plurality of ink jet printheads not shown in this figure. However, such multicompartment construction is generally well known in the art and is disclosed in more detail in the above identified Baker et al application Ser. No. 880,774.

Referring now to FIG. 2B, the right hand wall of the face plate 46 includes serpentine grooves 72 therein which become of decreasing cross-section as they wind back and forth upwardly in a continuous path from an ink feed port 74 to the top wall 76 of the face plate 46. These grooves 72 may be constructed in the form of three distinct and continuous capillary paths for three colors of ink in a three color ink jet pen, for example. Two of these serpentine capillary paths are shown in the partially cut away view of FIG. 2C. These serpentine grooves 72 are closed off by the adjacent abutting front wall 78 of the main ink reservoir 42, and a capillary ink feed tube 78 extends vertically downward as shown in FIG. 2B to pass ink to a thin film resistor type printhead 80 or the like which is not shown in detail herein. However, this printhead may be of the type disclosed in the above identified Baker et al application Ser. No. 880,774.

Thus, as described above with reference to FIG. 1A, the ink will move upwardly in the balanced capillary tube/vent combination 72 as temperature and pressure within the ink reservoir 42 rise, and will move back down the tube/vent 72 as pressure and temperature within the main ink reservoir 42 again decrease. This action has the effect of maintaining a substantially constant negative back pressure at the printhead 80 and within the capillary ink feed tube 78.

Referring now to FIG. 2C, the cut away section of this figure shows the serpentine geometry of two of the capillary feed tubes 72 which extend from one of the main ink reservoir access ports 74 and upwardly as shown to the top of the pen structure. The pen structure in FIG. 2C also includes a feed tube 78 which extends as shown from the reservoir access port 74 and downwardly at an angle toward an ink jet printhead 80. When using the ink jet pen of FIG. 2 in multi-color applications, there will be a separate capillary tube 72 for each color and black, and clear vehicle if desired.

Figure 3A:
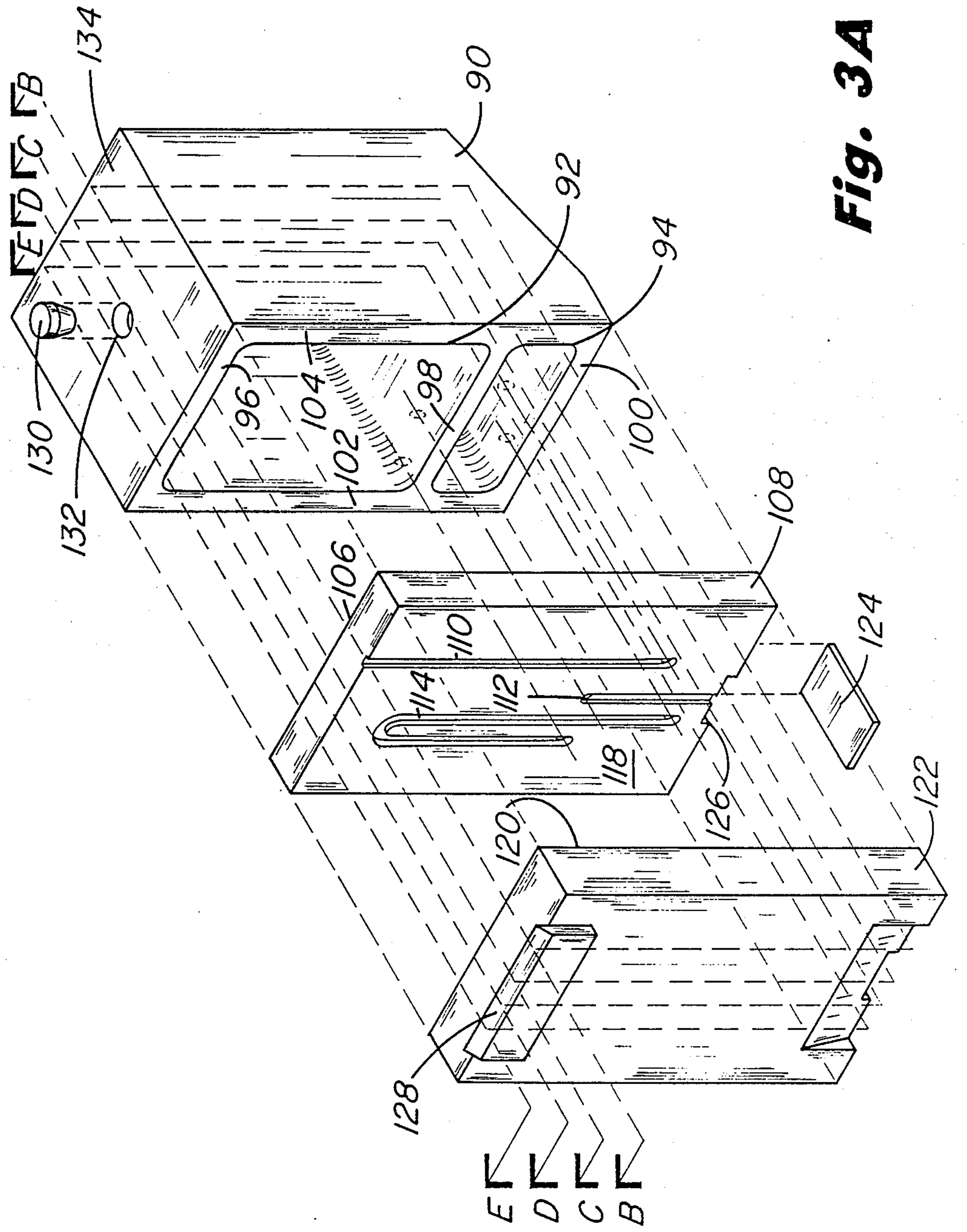
FIG. 3A is an exploded isometric view illustrating a second embodiment of the invention referred to herein as the dual reservoir capillary system embodiment number 1.

Referring now to FIGS. 3A–3E, the exploded isometric view in FIG. 3A includes an ink reservoir housing member 90 having a primary ink reservoir 92 and a secondary ink reservoir 94 located as shown in the upper and lower regions of the reservoir housing 90 respectively. The near facing outer wall sections 96, 98, 100, 102 and 104 will, when the pen is completely assembled, directly abut the back wall 106 of an intermediate capillary section 108. The capillary section 18 includes a vertical vent tube 110, a capillary ink feed tube 112 centrally located within the capillary section 108 and a left hand inverted U-shaped capillary balance tube 114. These tubes 110, 112 and 114 are actually formed by grooves as indicated within the near facing surface 118 of the capillary section 108, but will become closed ink feed tubes once the front face 118 of the section 108 is moved directly adjacent to the right side wall 120 of a front cover plate 122 for the ink jet pen. When assembled, a thin film printhead 124 will be positioned within the centrally located offset region 126 which is defined along the bottom facing surfaces of the intermediate and front cover members 108 and 122 previously described. The front cover plate 122 includes a latching member 128 which facilitates the loading and unloading of the pen into a pen carriage member or the like, and an ink fill plug 130 is positioned as shown for insertion into an ink fill hole 132 in the top wall 134 of the ink reservoir housing 90.

Figure 3C:
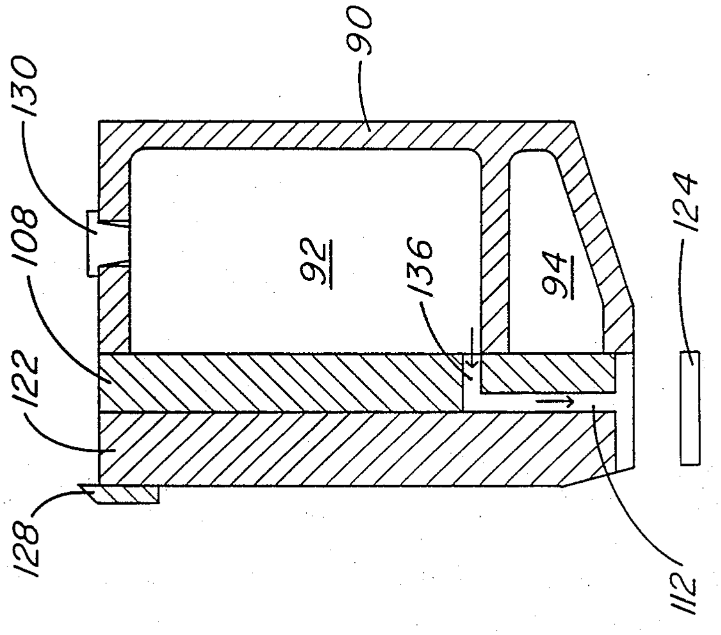
FIGS. 3B, 3C, 3D and 3E are cross sectional views taken along lines B,C,D and E respectively of FIG. 3A.
Figure 3B:
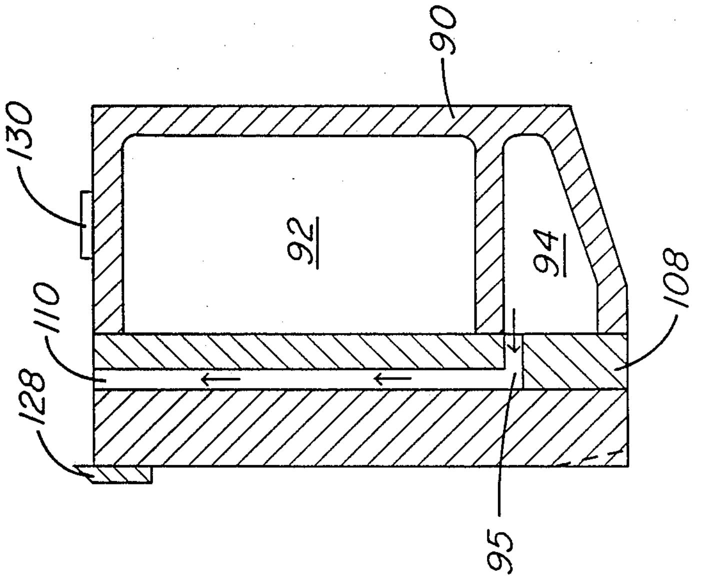

Referring now to FIGS. 3B–3E in conjunction with the previously identified FIG. 3A, the cross section view in FIG. 3B is taken through the center line of the vent tube 110, and the vent tube 110 extends from the secondary reservoir 94 and from a lateral ink flow port 95 and up to the top surface of the capillary section 108. In addition to providing air flow to the outside ambient, the vent tube 110 also provides ink overflow capacity when the secondary reservoir 94 fills up and the temperature and pressure within the pen body housing continue to rise and continue to exert force on the ink and move the ink upwardly in the vent tube 110. This action would occur beyond the upper operational temperature range in which the pen is expected to operate. The vent tube 110 corresponds to the vertical capillary tube 28 in FIG. 1B.

Referring now to FIG. 3C, the capillary feed tube 112 shown therein extends from a horizontal ink reservoir access port 136 and downwardly to the ink jet printhead 124 previously identified. This feed tube 112 is the main operational ink channel for supplying ink from the main ink reservoir 92 and to the ink jet printhead 124.

Figure 3E:
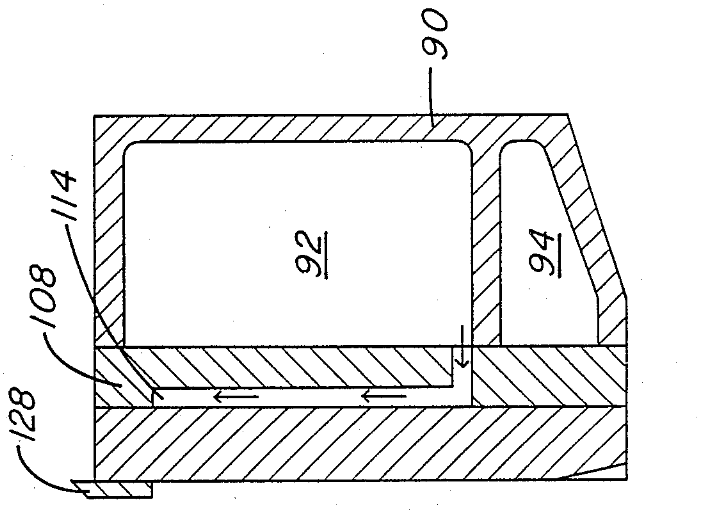
Figure 3D:
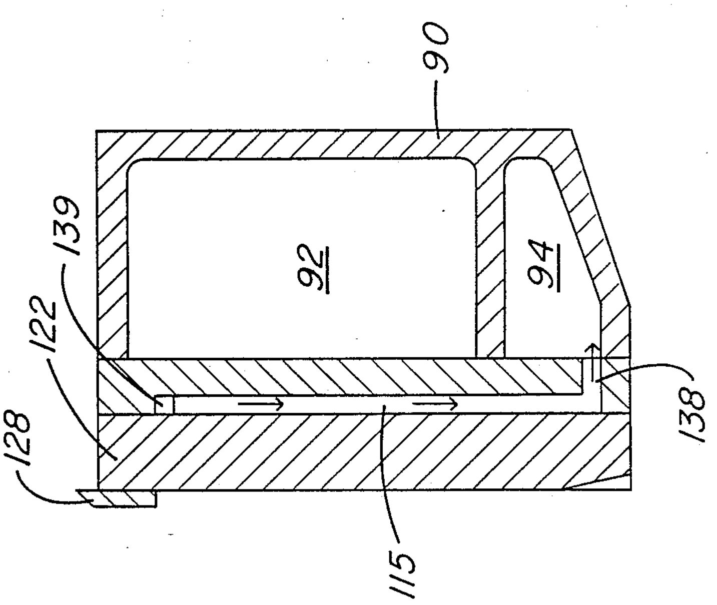

Referring now to FIG. 3D, this figure is a cross section view taken along the right hand portion of the U-shaped capillary balance tube 114 and extends as shown from a lateral ink passageway 138 to the secondary ink reservoir 94 and the apex 139 of the tube 114.

The cross section view in FIG. 3E is taken along the left hand portion of the U-shaped capillary balance tube 114 and shows the completed path of ink flow from the primary reservoir 92 and to the secondary reservoir 94, so that the direction of capillary ink feed will be along the direction of arrows in FIG. 3E and upwardly in this figure and then back downwardly in FIG. 3D and into the secondary ink reservoir 94. Thus, it is only after the ink flowing in the direction of arrows in FIGS. 3E and 3D fills the secondary ink reservoir 94 when the ink will then begin to flow in the direction of arrows in FIG. 3B and upwardly in the vent tube 110 shown therein. This will occur only when the pen is operating beyond its uppermost temperature range.

Figure 4A:
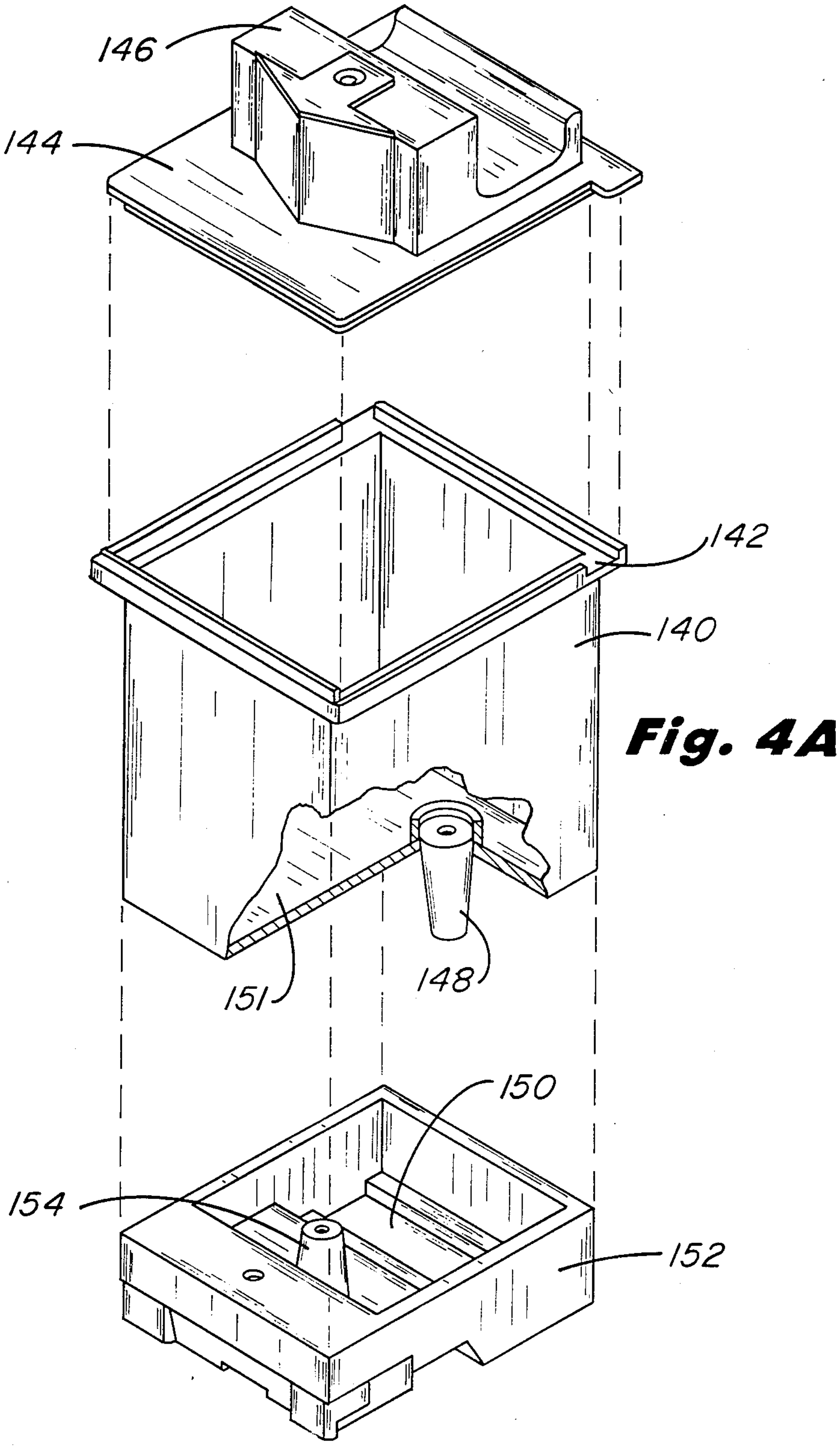
FIG. 4A is an exploded isometric view illustrating a third embodiment of the invention referred to herein as the dual reservoir capillary system embodiment number 2.
Figure 4B:
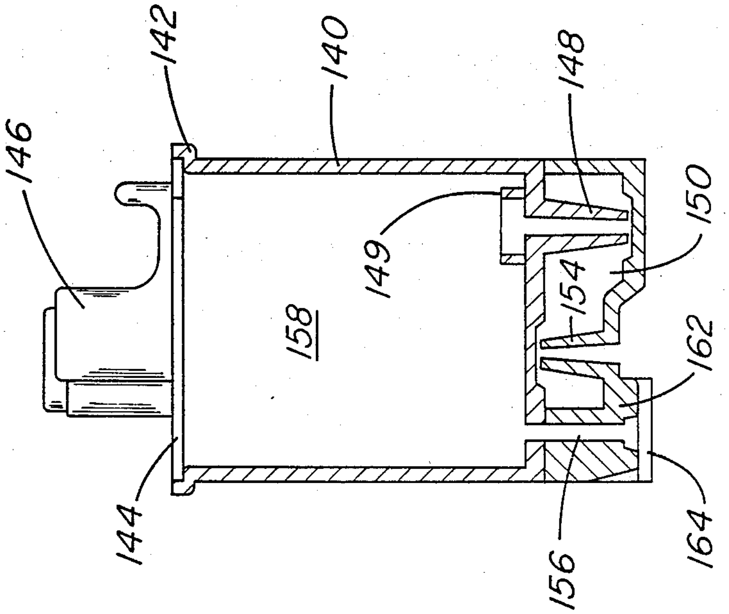
FIG. 4B is a cross sectional view taken along lines B—B of FIG. 4A.

Referring now to FIGS. 4A and 4B, this dual reservoir capillary system embodiment number 2 corresponds to the previously described schematic in FIG. 1C. In FIG. 4A, the primary reservoir housing 140 includes a top rim or ledge section 142 extending laterally outward from the housing 140 and configured to receive a top plate 144 having a pen carriage latching assembly 146 in the geometry shown. The reservoir housing 140 is integrally joined to a capillary balancing tube 148 of conical inner and outer geometry which extends downwardly into a secondary ink reservoir region 150 within the secondary ink reservoir housing 152.

The secondary reservoir housing 152 also includes an integral, upwardly extending vent tube 154 of conical outer geometry like that of the capillary balancing tube 148. The tube 154 is referred to herein as a vent tube since it serves as an air vent to the outside ambient.

Referring now to FIG. 4B, the cross section view in this figure is taken through the center lines of the two matching tubes 148 and 154 and shows a main capillary feed tube 156 extending from the primary reservoir 158 within the reservoir housing 140 and to a printhead member 164. The printhead 164 is mounted on the downwardly facing surfaces of the secondary reservoir housing member 162.

When operating in a normal room temperature range, ink will be supplied directly from the primary reservoir 158 and through the ink feed capillary tube 156 to the ink jet printhead 164. In this operating condition, negative backpressure is maintained by the surface tension of air bubble formation and is enhanced by the geometry of the shroud member 149 which forms a well around the entrance to the capillary balancing tube 148. When temperature and pressure within the ink reservoir housing 140 rise above a certain level, ink will be drawn by capillary action down through the capillary balancing tube 148 and into the secondary reservoir 150. When temperature and pressure within the reservoir housing 140 begin to decrease back to or toward a normal room temperature operating range, ink in the secondary reservoir 150 will be drawn by reducing pressure in the primary reservoir back up through the capillary balancing tube 148 and into the primary reservoir 158. During this operation, the vent tube 154 provides air flow into and out of the secondary reservoir 150 from the outside ambient.

As shown in FIGS. 4A and 4B, a shroud 149 extends upwardly of the capillary balancing tube 148 and will serve as an ink well and be filled with ink even after the ink level in the main ink reservoir 140 nears the bottom floor 151 of the pen body housing. In this manner, bubble formation will occur within the well formed by the shroud 149 and will continue to regulate pressure within the main reservoir housing 140 even as the ink level therein approaches the floor 151. Thus, this pressure regulation continues up until the time that the ink jet pen is completely out of ink.

Various modifications may be made in the above described embodiments without departing from the scope of this invention. For example, the present invention is not limited to the particular geometry or attachment method or ink flow mechanism of the printheads, e.g. 164. These thin film printheads and related attachment methods are generally well known in the art and typically include a thin film resistor substrate, an intermediate barrier layer defining individual reservoirs for resistor heaters or other equivalent transducers and an outer orifice plate. For a further discussion of such structures, reference may be made to the *Hewlett-Packard Journal,* Vol. 38, No. 5, May 1985, incorporated herein by reference. In addition, the printhead and ink feed structure of the above identified Baker et al application Ser. No. 880,774 may be used with the above described pen body housings and related capillary feed structures.

There are many other design and construction modifications which may be selected by those skilled in the art within the scope of the appended claims. These modifications would include, but are not limited to, changes to the internal geometry of the capillary balancing tube 148 in FIG. 4 and the geometry, location and design of the shroud 149 in FIG. 4. It is also to be understood that in multicolor (and black and untoned vehicle) applications, there will be separate compartments like those described above for each color, black and clear vehicle. The above described embodiments in FIGS. 3 and 4 show only a single color (or black) ink reservoir construction for sake of brevity, and clearly the appended claims are equally directed to multicolor pens as well as black pens, or a combination of the latter.

Finally, for a further discussion of related slot-feed ink flow techniques and single point tape automated bond (TAB bond) electrical interconnect methods used for ink jet printhead construction and mounting, reference may be made to U.S. Pat. Nos. 4,680,859 and 4,683,481 issued to S. A. Johnson and U.S. Pat. No. 4,635,073 issued to Gary E. Hanson and all assigned to the present assignee and incorporated herein by reference.

We claim:

1. A method for controlling backpressure in an ink jet pen which includes:

a. providing primary and secondary ink reservoirs in a pen body housing,
b. providing ink in said primary reservoir and maintaining said ink at a controlled pressure,
c. providing an open ink flow path between said primary and secondary reservoirs, and
d. flowing ink back and forth through said open ink flow path between said reservoirs in response to variations in ambient temperature and changes in pressure above the liquid surface of said ink, whereby ink may be supplied from said main ink reservoir to an ink jet printhead at a substantially constant backpressure over a 2. The method defined in claim 1 wherein the flowing of ink back and forth between reservoirs includes introducing air bubbles into said primary ink reservoir from a capillary ink flow path thereto, whereby pressure regulation in said primary reservoir is maintained by a combination of bubble formation therein and the surface tension and capillary action of ink in said capillary ink flow path.

3. An ink jet comprising:

a. an ink supply housing having a primary ink reservoir and a secondary ink reservoir therein,
b. a balancing capillary member positioned adjacent to or within said ink supply housing and including an open ink flow path extending between said primary ink reservoir and said secondary ink reservoir and operative to draw ink from said primary ink reservoir and into or towards said secondary ink reservoir by capillary action with changes in pressure above the ink within said primary ink reservoir, and
c. means interconnecting said primary ink reservoir to an ink jet printhead for supplying ink to said printhead during an ink jet printing operation.

4. The ink jet pen defined in claim 3 wherein said balancing capillary member is positioned adjacent openings to both of said primary and secondary ink reservoirs and includes an ink flow path therein which extends from an ink feed port in said primary ink reservoir to an ink feed port in said secondary ink reservoir.

5. The ink jet pen defined in claim 4 wherein said balancing capillary member further includes a main ink distribution path extending between said main ink reservoir and a printhead support surface and an ink overflow path extending between said secondary ink reservoir and the outside ambient.

6. The ink jet pen defined in claim 5 wherein said printhead is a thin film printhead mounted on said support surface and is fed ink by a path extending directly to said primary reservoir.

7. In an ink jet pen having a pen body housing with a primary ink reservoir therein for storing ink and a printhead with ink ejection means mounted on or in said housing and operative to receive ink from said primary ink reservoir during an ink jet printing operation, the improvement characterized in that said housing further includes a secondary reservoir and means including an open capillary path for flowing ink back and forth between said primary reservoir and said secondary reservoir as a function of changes in pressure above the surface of ink stored in said primary reservoir.

8. The pen defined in claim 7 wherein said secondary reservoir is a tubular shaped feed path which extends from said primary reservoir to the outside ambient.

9. The pen defined in claim 7 wherein said secondary reservoir is separated from said primary reservoir and said flowing means is a non-linear capillary tube connecting said primary and secondary reservoirs.

10. The pen defined in claim 9 wherein said non-linear capillary tube is formed in a capillary section of said housing and is positioned directly between openings in said primary and secondary reservoirs for passing ink therebetween.

11. The pen defined in claim 7 wherein said secondary reservoir is separated from said primary reservoir and is connected thereto by means of a capillary tube.

12. The pen defined in claim 11 wherein said secondar reservoir is situated beneath said primary reservoir and is connected thereto by a capillary tube.

13. The pen defined in claim 12 wherein said secondary reservoir contains an air vent tube which extends to the outside ambient.

14. The pen defined in claim 13 wherein a separate ink well is formed around the opening of said straight capillary tube into said primary reservoir to enhance air bubble formation in said primary reservoir as it is being depleted of ink.

15. A device for maintaining a substantially constant backpressure in an ink jet pen which comprises:

a. primary and secondary ink reservoirs in a pen body housing and an ink ejection printhead mounted on or in said housing, and
b. means interconnecting said primary and secondary reservoirs for drawing ink by capillary action into or toward said secondary reservoir from said primary reservoir when the pressure above the liquid surface in said primary reservoir is increasing and further for returning ink into or towards said primary reservoir from said secondary reservoir when the pressure above the liquid surface in said primary reservoir is decreasing, whereby the backpressure at the ink ejection printhead of said device is maintained substantially constant over a given temperature range.

16. A method for controlling backpressure in an ink jet pen which comprises the steps of:

a. providing a controlled pressure above an ink surface in the primary reservoir of an ink jet pen,
b. providing a secondary ink reservoir for said pen,
c. providing an open ink flow conduit between said primary and secondary reservoirs,
d. flowing ink by capillary action from said primary reservoir and through said conduit and to or toward said secondary reservoir when the pressure above said ink surface in said primary reservoir is increasing, and
e. flowing ink through said conduit and to or toward said primary reservoir when the pressure above said ink surface in said primary reservoir is decreasing.

* * * * *

UNITED STATES PATENT AND TRADEMARK OFFICE

CERTIFICATE OF CORRECTION

PATENT NO. : 4,791,438

DATED : December 13, 1988

INVENTOR(S) : Gary E. Hanson et al

It is certified that error appears in the above-identified patent and that said Letters Patent is hereby corrected as shown below:

Column 9, line 15 of the Patent, after "a", insert --certain temperature range.--.

Column 10, line 18, delete "secondar", insert --secondary--.

Signed and Sealed this

Seventh Day of November, 1989

*Attest:*

JEFFREY M. SAMUELS

*Attesting Officer* *Acting Commissioner of Patents and Trademarks*